United States Patent [19]

Wallick

[11] 4,175,600
[45] Nov. 27, 1979

[54] ANTI-SYPHON SAFETY DISPENSER

[76] Inventor: Sherwin Wallick, 5012 Westbriar, Houston, Tex. 77056

[21] Appl. No.: 904,880

[22] Filed: May 11, 1978

[51] Int. Cl.$^2$ .......................... B65B 3/04; B67C 3/00
[52] U.S. Cl. .................................. 141/363; 141/375; 141/376; 220/86 R; 248/80; 248/405
[58] Field of Search .............. 141/231, 279, 284, 363, 141/364, 365, 366, 375, 376, 382, 392; 220/85 R, 85 S, 86 R; 248/80, 81, 83, 405; 251/144; 222/571

[56] References Cited

U.S. PATENT DOCUMENTS

| 1,713,424 | 5/1979 | Davenport | 222/571 |
| 2,439,642 | 4/1948 | White | 248/80 |
| 2,709,539 | 5/1955 | Swanson | 141/279 X |

Primary Examiner—Frederick R. Schmidt
Attorney, Agent, or Firm—Bard & Groves

[57] ABSTRACT

A dispenser apparatus for delivering water to a chemical or agricultural tank wherein a base plate is provided to removably attach the dispenser to the tank. An upstanding screw-threaded pedestal member extends from the base plate and carries a valved dispensing line that may be pivoted with regard to the horizontal as well as adjusted vertically. The screw-threaded pedestal member also allows the dispensing line to be revolved to any desired horizontally disposed dispensing position.

3 Claims, 1 Drawing Figure

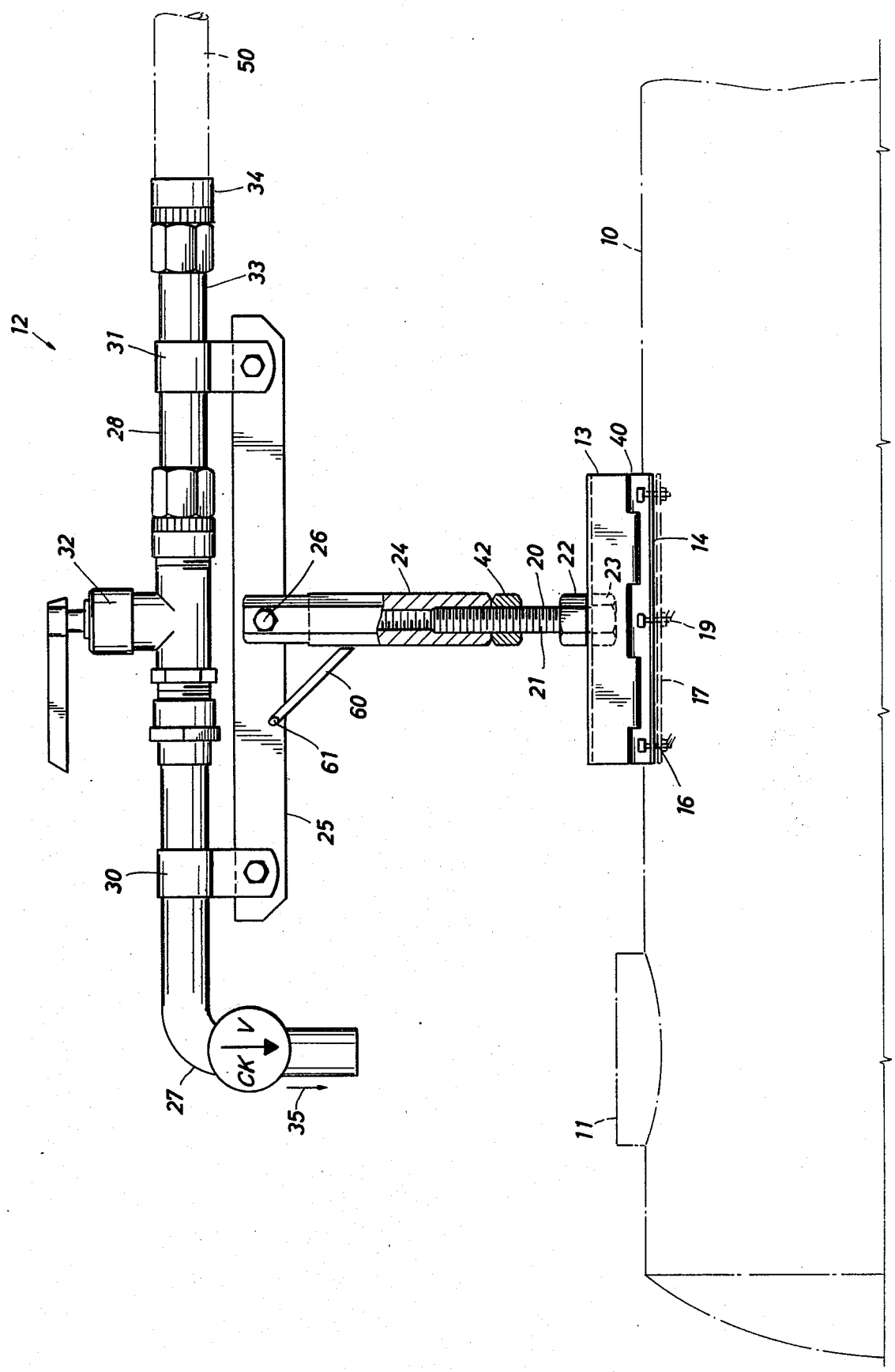

ANTI-SYPHON SAFETY DISPENSER

BACKGROUND OF THE INVENTION

This invention relates to an improved fluid dispensing apparatus for chemical or agricultural tanks, and more specifically relates to a pivoted, vertically adjustable, and horizontally revolvable, water delivery line that is removably mounted on a tank employed in conventional agricultrual, industrial, lawn and garden spraying equipment.

It is well known to employ tanks having handguns, reels, booms and trailer wheels for spraying applications ranging from high pressure cleaning, chemical treatment of trees and orchards, high volume turf and grounds sprayings, to mobile brush fire fighting. Such tanks are generally constructed of corrosion resistant polyethylene or stainless steel for the purpose of receiving water and treatment chemicals and compounds to be applied as a water solution. These tanks may range from capacities of 100, 150, 200, or up to 2,000 gallons, for example, and generally include a gasoline engine operated pump for delivering a chemical solution from the tank to a spraying nozzle. Some tanks are conventionally mounted on skids for transportation in the bed of a truck while others may be constructed as a trailer unit including tongue, wheel, and axle accessories. Standard equipment for such tanks also includes nylon strainers, suction line valves, transfer fittings, and agitator systems for mixing the chemicals added to the tank with the fluid therein generally water. In place of single line nozzle applicators, some treatment tanks have been provided with manifolds including individual rows of dispensing nozzles mounted to the tank in the fashion of a boom. In any event, as is apparent from the above, a wide variety of spray tanks are available for application in pest control, orchard protection, turf maintenance, and all types of general spraying.

It is also well known that applicator tanks and systems as heretofore described have generally been filled with water and chemicals via an opening in the top of the tank. The chemicals are generally measured out in the desired quantity and fed manually through the feed opening with the aid of a large mouth funnel feeder. Water, on the other hand, has been introduced into the tank by means of a garden hose which is generally inserted through the tank opening and forced to lie against the tank bottom until the desired capacity is reached. The water hose is then withdrawn, the top of the tank closed, and the agitation system energized in order to put the chemicals in solution. Thereafter, the system is put into its spraying applications.

Presently, however, Federal regulations aimed at environmental protection have prohibited the use of garden hoses when used in the above described fashion. This is based on the theory that the city water supply may become polluted by the back-up of chemicals in these tanks into the garden hose water supply during or after filling of the chemical applicator tanks. Such regulations, have accordingly required that any water filling supply system for an agricultural application be provided in a fashion so as not to bring the water feed conduit used during filling of the tank into contact with either the chemicals in the tank or with the resulting solution of chemicals therein. It has been suggested, therefore, that any system used to fill an agricultural tank include some means to mount the water supply externally of the agricultural tank and completely out of contact with the chemicals therein.

The fact that the use of an inserted hose to fill a chemical or agricultural tank is a disadvantage and in fact has been prohibited as noted above, has provided the need for some type of external arrangement for providing a free standing water supply for tanks employed in chemical or agricultural applications. Accordingly, it will be apparent that a free standing and externally mounted water supply system for a chemical or agricultural tank will be effective and that the disadvantages of prior water feeding arrangements for agricultural tanks will be overcome with the present invention. At the same time, the water feeding system of the present invention complies with the regulations prescribed by the Federal Government in the field of environmental protection and pollution control.

SUMMARY OF THE INVENTION

In an ideal form of the present invention, a water dispensing and feed supply arrangement for agricultural, industrial, lawn, gardening and general chemical spraying applications, is provided which may be either removably or permanently mounted on the chemical tank adjacent the fill opening therein. More particularly, the dispenser will include a base plate adapted to be connected to the top of the tank with the base plate having extending upwardly therefrom a screw-threaded pedestal.

A corresponding and mating collar member will be provided in surrounding relationship to the pedestal and having at its upper end a carriage assembly carrying the water feed line. The feed line will have a flow control valve of any conventional design and in addition may include a check valve to prevent back-flow into the line after the water has been fed into the tank.

More particularly, a pivotal mount is provided between the carriage assembly and the pedestal collar whereby the attitude of the feed line may be adjusted with respect to the horizontal. The mating and screw-threaded relationship between the pedestal and the collar member affords two further attitude adjustments of the feed line. Accordingly, the feed line may be moved vertically with respect to the top of the tank and further may be revolved horizontally about the top of the tank with respect to the feed opening therein.

The pivoted arrangement of the feed line provides the advantage that the feed system of the present invention may be used even on tanks having high upstanding lips in surrounding relationship to the tank opening. Thus, by utilizing the pivot, the feed line may be adjusted to a position above the lip in order to communicate the outlet of the feed line with the tank inlet. This same advantage is inherent with vertical adjustment of the feed line by manipulating the collar member about the screw threads of the pedestal. The revolving adjustment above referred to provides a means to bring the feed line in and out of fluid communication with the feed opening of the chemical tank to which it is applied.

These and other features and advantages of the present invention will become apparent from the following detailed description, wherein reference is made to the single FIGURE in the accompanying drawing.

DETAILED DESCRIPTION

Referring now to the drawing, there may be seen a simplified pictorial representation of a dispensing system and the like, but more particularly embodying the concept of the present invention.

More particularly, a portion of a chemical or agricultural tank 10 having a feed opening 11 is illustrated in phantom and including the dispensing system of the present invention shown shown in its relationship thereto. The dispensing system 12 as hereinbefore stated includes a base plate 13 of rectangular and channel-like construction. The base plate 13 is preferably constructed of stainless steel and has a pair of flange members 14 (only one of which is shown) each including two or more drilled openings 16. If desired, flanges 14 may be hinged at 40 to base plate 13 to accomodate any size or shape of tank. A pair of base plate mounting bars 17 (only one of which is shown) cooperate with the flanges 14 to attach the dispenser 12 to the top of the tank 10. It should be apparent that mounting of the dispenser merely requires that a series of openings be drilled in the tank top wall adjacent opening 11. The flanges 14 of the base plate are then aligned with the drilled openings such that openings 16 coincide therewith.

Bars 17 are then inserted into mounting opening and screw threadedly attached to the flanges 14 of the base plate 13 by means of nut and bolt elements 19. This arrangement provides for the permanent mounting of the dispenser 12 to the tank 10. In some instances, a permanent attachment of the dispenser 12 to the tank 10 may not be desirable, in which case, it would only be necessary, for example, to utilize a much larger sized base plate 13 whereby the dispenser could merely be situated thereon and removed at will. Weighted objects such as bricks could be placed atop the base plate 13 in order to keep the assembly steady during use. In any event, for convenience, the permanent connection of the assembly above set forth is preferred.

United to and extending vertically upwardly from base plate 13 is pedestal member 20 provided with screw threads 21. First and second lock nuts 22 and 23 are shown on the lower portion of pedestal 20 and provide the means for maintaining pedestal member 20 in a predetermined attitude. A third lock nut 42 is also provided to adjust collar 24 on pedestal 20. Thus, the interior of collar member 24 includes female screw threads for mating relationship with the male threads 21 of pedestal 20.

It should be apparent that turning of collar 24 with respect to pedestal 20 will raise or lower collar 24. Once in the raised position desired, the lock nut 42 may be brought into contact with the lower edge of collar 24 to fix collar 24 in the selected location. The reverse procedure is followed to lower collar 24 on pedestal 20.

Atop collar 24 is provided a carriage assembly 25 connected thereto by means of a pivot pin 26. As should be apparent, pivot pin 26 allows the carriage assembly 25 to be moved into and out of the horizontal plane. Thus, spigot 27 may be raised or lowered by hand pressure applied to the carriage assembly 25 whereby carriage assembly 25 and including spigot 27 and feed line 28 will rotate or pivot with respect to collar 24 about pivot pin 26. Pivot pin 26 may include a wing nut whereby the carriage assembly 25 can be fixed in a particular pivoted location. Attached to carriage assembly 25 and arranged in surrounding relationship to feed line 28 are a pair of bracket members 30 and 31 for holding feed line 28 and carriage assembly 25 together as a unit. Alternatively, feed line 28 and brackets 30 and 31 could be constructed unitarily and then connected in turn to carriage assembly 25. A conventional valve 32 is provided in feed line 28 for alternately cutting on and cutting off the flow of water from the inlet side 33 of feed line 28 into the spigot 27. The terminal end of the inlet side 33 of feed line 28 may be provided with any suitable hose connector 34 such as a garden hose connector or a connector of the fire hose type. To connector 34 is attached the water supply 50. Spigot 27 includes a check valve allowing flow in only the direction of arrow 35 and preventing flow in the opposite direction.

The materials of construction of the dispensing system of the present invention are not critical, however, stainless steel is preferred because of its corrosion resistance. Of course, other conventional materials of construction having corrosion resistant properties may be utilized, for example, polyethylene, polyvinyl chloride, and copper, depending on use.

In use of the dispensing system of the present invention, the water supply, generally from a hose and under city water pressure, is connected to the connector 34 of the dispenser 12. Valve 32 in feed line 28 is then opened thereby providing a flow path for the water out of spigot 27 and into the opening 11 of tank 10. If spigot 27 is found to be out of alignment for flow of water into opening 11, valve 32 is closed and the water supply disconnected at 34. The feed line 28 may then be set in a proper attitude for directing water into opening 11 by adjustment of carriage assembly 25 about pivot pin 26, by vertically moving collar 24 with respect to pedestal 20, or by revolving collar 24 about pedestal 20 to align spigot 27 and opening 11. Water supply is then reattached at connector 34 and valve 32 opened to resume flow.

As hereinbefore indicated, a dispenser which embodies the concept of the present invention will clearly by especially suitable for chemical or agricultural implementation. However, it will also be apparent that a dispenser of this type will overcome the disadvantages of prior tank filling arrangements where hoses are plunged down through tank openings. In the present invention depicted and described, spigot 27 rides above tank opening 11 and remains out of contact with the contents of tank 10 as prescribed by recent and current by recent and current federal requirements in the fields of environmental protection and pollution abatement.

Although the form of the present invention has been directed to uses primarily in the chemical and agricultural field, it will be apparent that the dispenser depicted and described herein may be used in other areas where it is desired to direct a liquid into a tank.

Referring again to the drawing, and to the fact that the feed line 28 is pivotable with respect to pin 26, it will also be seen that counter clockwise rotation of the feed line 28 may bring the spigot 27 adjacent opening 11 in the tank 10. If this occurs, however, the result may be to effect the very sort of contamination of the contents of tank 10 which the present invention seeks to avoid. Pin 26 is preferably secured by a wing nut (not depicted) and the like, which may be used to secure assembly 25 against any rotation. On the other hand, it will also be apparent that pin 26 may become loosened inadvertently, whereby rotation of carriage 25 or pin 26 may occur. Accordingly, an angle bracket 60 may be secured by nut 61 to carriage 25 to limit such rotation in a counter clockwise direction, whereby the spigot 27 cannot be inadvertently brought near or into such opening 11.

Other variations and modifications will become apparent from consideration of the structures and teachings hereinbefore provided and depicted. Accordingly, the various structures hereinbefore described and depicted in the accompanying drawings are intended to exemplify the concepts of the present invention, and are not intended to be limitations thereon.

What is claimed is:

1. An improved fluid dispenser comprising a base plate adapted to be connected to a fluid receiving tank having a feed opening, a pedestal member extending upwardly from said base plate, a collar member in surrounding relationship to said pedestal member and adjustably mounted with respect thereto, a carriage assembly including a fluid feed line attached to the upper end of said collar member, valve means in said feed line to control the flow of fluid therein, said collar member being vertically adjustable on and revolvably mounted with respect to the pedestal member by means of corresponding and mating screw threads on each of said collar member and said pedestal member, means for pivotally mounting said carriage assembly to the upper end of said collar member, said carriage assembly including a pair of bracket members attached thereto and in surrounding relationship to said feed line, said feed line including a hose connector means at one end thereof, said feed line further including a spigot having a check valve therein at the other end thereof, a pair of spaced locking nuts in surrounding relationship to said pedestal member and interposed between said base plate and said collar member, one of said pair of locking nuts being located adjacent said base plate and the other of said locking nuts being located adjacent said collar member to vertically adjust said collar member on said pedestal member, said base plate being channel-like in configuration and including a pair of flange members with each of said flange members having bar means in association therewith for extending into openings in said fluid receiving tank to mount said dispenser on said tank, and wherein said flange members are hinged to said base plate to accomodate different sized fluid receiving tanks.

2. The dispenser described in claim 1 wherein said check valve is a monodirectional valve means in said spigot for preventing backflow of aqueous mixture into the fluid in said feed line and allowing flow of fluid out of said spigot and into aqueous mixture in said tank.

3. The dispenser described in claim 2 wherein bracket means are secured to said carriage assembly to limit counterclockwise rotation of said carriage assembly whereby said spigot is prevented from entering said feed opening.

* * * * *